D. M. SMITH.
MOTOR VEHICLE CONTROLLING MECHANISM.
APPLICATION FILED MAY 22, 1914.
1,372,204.
Patented Mar. 22, 1921.
2 SHEETS—SHEET 2.
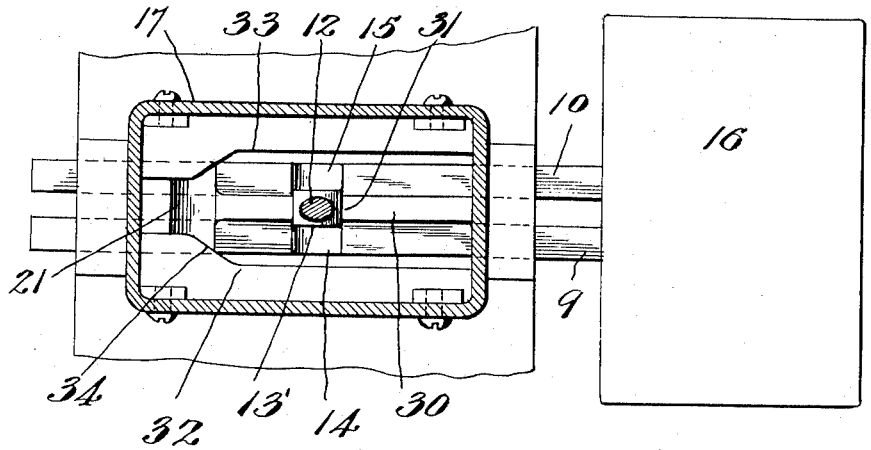
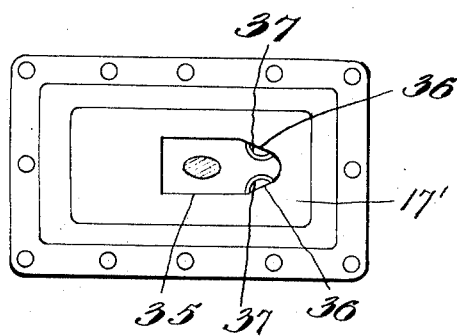
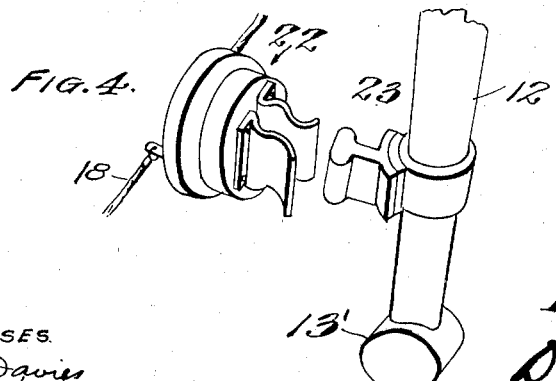
WITNESSES.
C. K. Davies
M. A. Word
INVENTOR
D. M. Smith

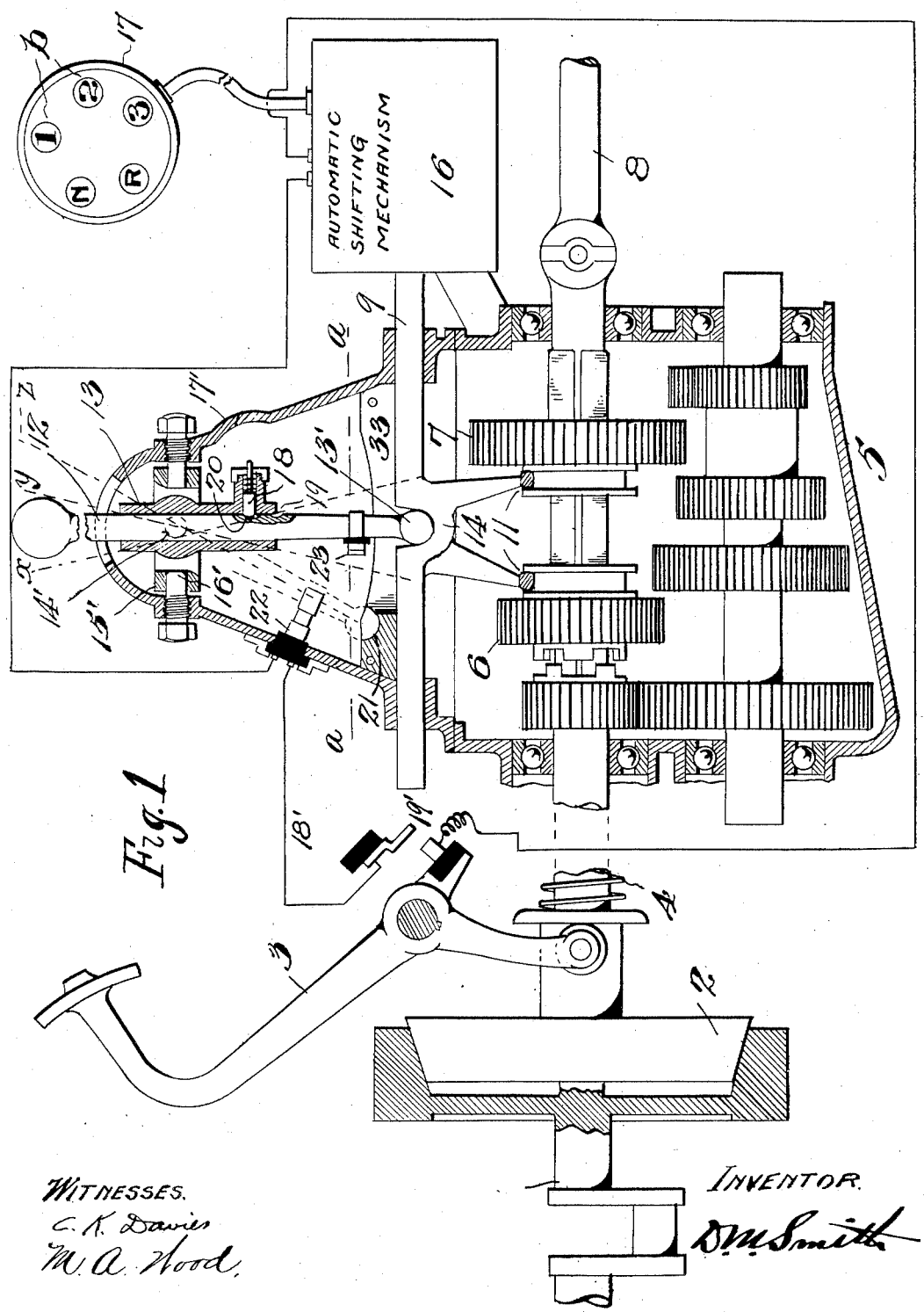

UNITED STATES PATENT OFFICE.

DEMPSTER M. SMITH, OF WASHINGTON, DISTRICT OF COLUMBIA.

MOTOR-VEHICLE-CONTROLLING MECHANISM.

1,372,204. Specification of Letters Patent. Patented Mar. 22, 1921.

Application filed May 22, 1914. Serial No. 840,351.

*To all whom it may concern:*

Be it known that I, DEMPSTER M. SMITH, a citizen of the United States, residing at Washington, District of Columbia, have invented certain new and useful Improvements in Motor - Vehicle - Controlling Mechanism, of which the following is a specification.

In automobiles having a motor, clutch, and changeable gearing between the clutch and the driving wheels, it has, until recently, been customary to provide a hand lever for shifting the gears when the clutch is released by pressing upon a pedal. A recent improvement consists in providing selective means by which the desired change in gear ratio may be chosen in advance and the shift to that ratio accomplished automatically when the pedal is depressed. The automatic shifting means coacting with the pedal is either electric, pneumatic or mechanical, or a combination of such means. The hand shifting lever is supposed to be dispensed with when the automatic shifting means is used, but in some cars an arrangement is made for putting a hand lever into position so that it may be used to operate the gears if the automatic means fails for any reason. Ordinarily, the lever is carried in a tool box or laid on the floor of a car, and it normally has no operative relation to the mechanism.

Among the purposes of my invention are: to provide in connection with automatic shifting means, a hand lever having an operative relation to the gearing with means by which, when desired, the automatic shifting operations may be carried on without interference by or with the hand lever; to provide means for connecting and disconnecting the hand lever with the gears or with gear shifting means; to place the hand lever in a special position, as, for instance, a position more than ordinarily out of the way of the driver or passengers of the car when the lever is disconnected from the gear shifting means; and to render the automatic shifting mechanism inoperative when the hand lever is in active relation to the gear shifting means. In a practical embodiment of the invention, means may be provided for realizing one or more of the foregoing objects and it is not necessary in every embodiment to accomplish all the functions stated, although usually it would be desirable to provide for all of them.

The accompanying drawing shows one physical embodiment of the invention but it must be understood that the invention is capable of embodiment in very many different forms, and this is especially apparent in view of the diversity of gearing, hand shifting mechanism and automatic shifting mechanism employed or suggested up to the present time.

In the accompanying drawings:

Figure 1 is a view partly in elevation and partly in section of representative mechanism embodying the invention;

Fig. 2 is a section at *a—a*, Fig. 1;

Fig. 3 is a top plan of the lever housing with the lever in section, and

Fig. 4 is a detail of circuit interrupting means.

Reference character 1 designates the crank shaft of an engine, 2 a clutch, 3 a pedal for releasing the clutch against the pressure of the clutch spring 4; 5 a gear box, 6, 7, shiftable devices to give different drive ratios to the drive wheels through shaft 8 or other driving means. Shifting rods 9 and 10 are connected, respectively, with shiftable members 6 and 7 by yokes 11. A hand shifting lever 12 is mounted in relation to the gear box in such a way that its end 13′ may be shifted to engage the socket 14 in rod 9 or a socket 15 in rod 10, and may thereupon be moved to throw either rod in either direction, this hand shifting being accomplished after the clutch pedal is depressed to release the clutch. As so far described, the mechanism is a representative embodiment of ordinary hand shifting mechanism.

16 designates, as a whole, automatic shifting means, the details of which may vary and are not essential to this invention. A few representative forms of automatic shifting mechanism to which my invention is adaptable are described and illustrated in the following publications: An article entitled "The Vulcan Electric Gear Shifting Mechanism," *The Horseless Age*, New York, vol. 31, No. 14, pp. 620, 621, April 2, 1913. "Norwalk Underslung Six for 1914," *The Horseless Age*, New York, vol. 32, No. 4, pp. 146, 147, July 23, 1913, describing the Vulcan mechanism as applied to the Norwalk car. "New Haynes Models," *The Horseless Age*, New York, vol. 32, No. 15, pp. 582, 583, 584, October 8, 1913. At the top of page 584 is shown automatic shifting mechanism as applied at that time to the Haynes car. "The Gray Pneumatic Gear Shift," *The Horseless Age*, New York, vol. 32, No. 23, p. 960, December 3, 1913. The automatic shifting means coöperates with the shifting rods to shift the gear members when one of the buttons *b* of the selective controller 17 is depressed and when the clutch pedal is depressed to complete a circuit indicated by 18′ and comprising contacts 19′ broken when the clutch is engaged but closed when the pedal is depressed a sufficient distance after the clutch is disengaged. When the automatic means is provided, a hand lever 12 would, according to present practice, be entirely disconnected and removed from the location shown and either carried loose for emergency purposes or discarded entirely. The gear shifting operation would then consist in depressing one of the buttons *b* to establish or partially establish a magnet circuit for moving one of the shifter rods 9, 10, in one direction, then depressing the pedal to release the clutch and continuing the depression until contacts 19′ are engaged, whereupon the magnet circuit is completed or a master circuit is closed to cause the actuation of the rod by its magnet, and the corresponding shifting of the element 6 or 7. Electrical or mechanical means are also usually provided for the purpose, when one of the shiftable elements is already in an engaged position, of returning that element to neutral position before it or the other element is moved to a new engaged position. Since the present invention is not dependent on any particular system of automatic shifting means it is not considered necessary to show further details of such means.

The electrical apparatus of an automobile is usually quite reliable but various derangements are possible. At the same time, the function of gear shifting is of the greatest importance for obvious reasons. It may, therefore, happen that the automatic shifting means may become inoperative (and this is true whether such means be electrical, pneumatic, or mechanical, or a combined system), and in such case, according to the ordinary practice, the driver would have to find the hand shifting lever if he had it with him and put it in position with more or less delay and annoyance, and in some cases delay would have serious results, as for instance if the automatic shifting means failed to work when the car happened to be on railroad tracks, a steep grade, etc. Also, the derangement of the automatic means might not be complete, and it might be capable of moving the shifter rods or one of them in one or more directions but not in all, and, therefore, after the hand lever was put in position the operator might carelessly attempt to operate the automatic means and such operation, by conflict with the hand lever, might cause breakage or other undesirable results.

I, therefore, in connection with automatic shifting means, mount the lever 12 in operative relation to the gear, as shown, and provide means for quickly connecting and disconnecting the lever with the shifter rods. Referring to the particular embodiment, the lever is slidably mounted in a sleeve 13. This sleeve is supported by trunnions 14′ and gimbal ring 15′, and the ring is supported upon trunnions 16′ in a housing 17′. The ball or cylindrical-shaped end 13′ of the lever may thus be brought into operative connection with the shifter rods by entering their sockets 14, 15, when the lever is moved down through its sleeve, as shown in the drawing, or the lever may be quickly disconnected by pulling it up, although it is still in an operative and easily connectible relation to the gearing. Means may be provided for maintaining the lever in disconnected position. For instance, the spring plunger 18 carried by sleeve 13 may engage a notch 19 in the lever to hold it in disconnected position and another notch 20 may be provided if desired to assist in holding the lever in connected position. It may also be desirable to provide additional or different means for maintaining the lever in disconnected position, such as the socket 21 in which the lower end 13′ of the lever may rest when disconnected. The degree of motion of the lever in shifting may be such as is indicated by the dotted lines *x*, *y* and when disconnected the lever may be permitted to remain in any position within these limits, but it may be desirable for greater convenience to place the lever when disconnected in some different or special position, such, for instance, that it may be more out of the way of driver or passengers. Therefore, provision is made for placing the lever when disconnected in the special position indicated by the dotted line *z* beyond the limits of its shifting movement and this special position of the lever might be either in a longitudinal or a lateral direction, as is desired.

It may also be desirable to provide means for rendering the automatic shifting mechanism inoperative when the hand lever is in connected position, or for rendering the automatic mechanism operative when the hand lever is in disconnected position, or both. As a representative embodiment of such means, I place in the circuit 18′ contacts 22, and upon the lever is placed a connector or contact piece 23, which may be suitably insulated, and these parts are arranged so that when the lever is brought into the position indicated by the line *z*, contact 23 engages contacts 22 and completes circuit 18′ except for the master contacts 19′, so that the master contacts control automatic shifting in the usual way; but when the lever is not in connected position, contact 23 is removed from contacts 22 and the master circuit is broken so that the automatic means cannot be operated in any way and breakage or annoyance is prevented.

This interrupting means for the automatic shifting mechanism is here embodied in relation to electrical or electro-mechanical shifting means, but evidently it may be suitably embodied for pneumatic or mechanical means.

The shifter rods 9 and 10, as shown in Fig. 2, may be any convenient distance apart. In some cases there may be placed between them a partition or rib 30, and the top of this may be flush with the top of the rods, and in this case there will, in a place corresponding to the neutral position of the lever, be provided in the rib a transverse channel or aperture 31 to accommodate the operative end 13' of the lever and permit the shifting of the lever from one side to the other to engage with either of the rods. This particular embodiment will in some cases be advantageous in facilitating the engagement of the lever with the rods when it is desired to employ hand shifting. For instance, the operator need only move the lever to substantially vertical position or away from the inoperative position shown in dotted lines in Fig. 1 and press the lever down until its end 13' engages the top of the rib or of the partition 30. By moving the lever from side to side and then forward and back, the operator will very quickly locate one of the shifter sockets 14, 15, and by further depressing the lever will then engage its member 13' with the socket and can then shift the corresponding rod as desired. Interlocking devices between shifter rods are common and it is also common to arrange these so that when one of the rods has been moved to place its corresponding gear member in an active position the other rod or rods which remain in neutral position are locked and cannot be moved until the active rod is moved back to neutral position. Such devices being customary and well known in the art, it is not believed necessary to show or describe them further. When such a device is employed if the operator accidentally engages the lever with a rod in neutral position when one of the other rods is in active position, he will be unable to move the neutral rod, and perceiving this will immediately shift the lever to engage the active rod and bring it back to neutral position before shifting it or another rod to another active position. The rib 30 may, if desired, extend above the faces of the shifter rods, and in that case it would be impossible to move the lever from one side to the other except when in neutral position. In some cases the rib or partition 30 may be dispensed with. The suggested construction of the shifter rods with sockets 14, 15, countersunk below the upper surfaces of the rods will probably facilitate the engagement of the lever with the rods when desired, but instead any of the well known forms of lever sockets, in some of which projections extend above the rods or laterally to form engaging devices for the lever, may be employed and the lever may be engaged with such devices with possibly slightly more difficulty than in the specific structure here disclosed.

To easily guide the lever to its inactive position and to prevent it from rattling sidewise, and for other reasons, guiding devices may be employed. For instance, at the outer sides of the shifter rods may be ribs or guide rails 32, 33, and these may be provided with convergent faces 34 adjacent to the socket 21 to guide the end 13' of the lever to a socket in an obvious manner. These convergent faces are, of course, placed beyond the limits of movement of the lever when in its active positions. Otherwise, the housing 17', which is provided with aperture 35 to accommodate the lever above its pivot, may be provided with convergent guiding surfaces 36. Both of these devices just described may be used together in some cases. It has been stated that the contact members 22 may serve to retain the lever in inactive position, but if for any reason it is not desired to employ the contacts for this purpose, spring clips 37, located on or within the housing 17', may be employed to engage the upper shaft of the lever, or, in a broad sense, any other suitable device may be used to hold the lever in inactive position.

It is of great importance that the shifting mechanism should be capable of engagement with the shifter sockets in whatever position the shifter rods may happen to be at the time that hand-shifting is resorted to. Evidently, when the automatic mechanism fails, or when it is desired to shift by hand for any other reason, the shifter rods may be in any of their possible positions. If any of the gears are in engagement, the corresponding shifter will be away from its central or neutral position, and it will be necessary to move the hand-shifting mechanism in such a way that the socket in this active shifter may be engaged and the shifter with its gear brought back to a neutral position before any other shifting operation is performed. My invention evidently provides fully for this necessity, because in any position of the shifter rods the lever may be manipulated so as to bring it into engagement with the socket of either rod.

The shifting levers of all selective sliding gear transmissions have a neutral position, and in many cases when in neutral position the lever is not actually in engagement with either of the shifter rods. If the lever could be depended upon to remain in this neutral position, automatic shifting could then be resorted to, but it would be impracticable because of the danger that the lever might at any time be thrown into engagement with one of the shifting rods and then injury to the mechanism or the driver would be almost certain. My invention is clearly distinct from any such customary arrangement because it provides for placing the lever in a position entirely outside the range of its active positions; for definitely locating the lever in its inactive position, and for rendering the automatic mechanism inoperative when the hand lever is moved from its inactive position. In any and all of the foregoing features my invention is clearly distinct from previous structures.

It will be evident from the foregoing that in the broader aspects of the invention I do not limit myself to details of construction, because various structures may be used to embody the principles disclosed, and, in fact, I do not limit myself in any respect to details otherwise than as claimed hereafter.

I claim:—

1. In motor vehicle controlling mechanism, the combination of gearing having shiftable members, shifters therefor, hand-shifting mechanism comprising a handle, and means for securing the hand-shifting mechanism in an inactive position.

2. In motor vehicle controlling mechanism, the combination of gearing having shiftable members, shifters therefor, hand-shifting mechanism comprising a handle, and means for placing the hand shifting mechanism in an inactive position beyond the range of its normal active movements.

3. In motor vehicle controlling mechanism, the combination of gearing having a shiftable member, hand shifting mechanism for said member comprising a handle, said mechanism having a plurality of normally active shifting positions in operative connection with or in juxtaposition to said member, and means for supporting the handle in definite operative relation to said gearing, said means being constructed and arranged to permit the hand shifting mechanism being placed in a disconnected, inactive position in relation to the shiftable member while maintaining the definite and operative support of the handle in relation to the gearing.

4. In motor vehicle controlling mechanism, the combination of gearing having shiftable members, shifters therefor, a movable lever support, a lever movably mounted in relation to said support so that it may be engaged and disengaged with the shifters, and means to maintain the lever when disengaged in a position beyond the range of its active movements.

5. In motor vehicle controlling mechanism, the combination of gearing comprising shiftable members, shifters for said members, hand shifting mechanism comprising a lever and means actuated by the lever for engaging the shifters selectively and moving them to shift said members, the shifting mechanism having a plurality of active positions including a neutral position intermediate the shifters but in juxtaposition to them, means for supporting the lever in definite relation to the gearing for all of its active positions and movements, and means by which the lever may be manipulated to disconnect the hand shifting mechanism from active relation to the shifters without removing the lever from its definite operative mounting in relation to the gearing.

6. In a motor vehicle, the combination with gearing including a plurality of shiftable members, of shifting mechanism capable of being placed in different positions for shifting, said positions including a neutral position, said shifting mechanism including a manually operated handle, and means for engaging a part of the shifting mechanism with either of the shiftable members in any of the positions in which the said members may be at the time of engagement.

7. In a motor vehicle, the combination of a gear box containing shiftable members of gearing and shifters therefor, hand-operating mechanism including a lever said mechanism being capable of being engaged with either of the shifters to move it in either direction and also having a neutral position, and means for supporting the lever definitely but movably in relation to the gear box to permit the lever to be manipulated for all of said active positions of the mechanism, including the neutral position, and means for placing the shifting mechanism in an inactive position outside the range of its active positions without discontinuing the definite support of the lever in relation to the gear box.

8. In motor vehicle controlling mechanism, the combination of gearing having shiftable members, shifters therefor, automatic shifting means, a manual lever for shifting, means for supporting the lever permanently in an operative relation to the gearing and permitting it to be placed in active or inactive position, and means for rendering the automatic shifting means inoperative when said lever is displaced from inactive position.

9. In motor vehicle controlling mechanism, the combination of gearing, shifter rods therefor, automatic means for moving said rods comprising an electric circuit, a manual shifting lever, means for supporting the lever in definite relation to the gearing, said means being constructed and arranged to permit placing said lever in an active or inactive position, and means for completing said electric circuit when said lever is placed in an inactive position.

10. In motor vehicle controlling mechanism, the combination of gearing, shifter rods therefor, automatic means for moving said rods comprising an electric circuit, a manual shifting lever, means for supporting the lever in definite relation to the gearing, said means being constructed and arranged to permit placing said lever in an active or inactive position, and means for interrupting said circuit when said lever is moved from inactive position.

11. In motor vehicle controlling mechanism, the combination of gearing, shifter rods therefor, automatic means for moving said rods comprising an electric circuit, a manual shifting lever, means to permit placing said lever in an active or inactive position, and means for interrupting said electric circuit and for rendering said automatic shifting means inoperative when the lever is in active position.

12. In motor vehicle controlling mechanism, the combination of gearing having shiftable members, shifting rods, automatic shifting mechanism, a clutch lever, means by which said automatic mechanism is rendered operative when said clutch lever is in a certain position, a hand shifting lever, means to permit placing said lever in active or inactive relation to the shifters, and means by which said automatic shifting mechanism is rendered operative when said lever is in inactive position.

13. In motor vehicle controlling mechanism, the combination of gearing having shiftable members, shifter rods, automatic shifting mechanism, a clutch lever, means by which said automatic mechanism is rendered operative when said clutch lever is in a certain position, a hand shifting lever, means to permit placing said lever in active or inactive relation to the shifters, and means by which said automatic shifting mechanism is rendered inoperative.

14. In motor vehicle controlling mechanism, the combination of gearing comprising shiftable members and shifters therefor, automatic shifting means, lever-supporting means and a lever permanently supported by said means in relation to the gearing but movable in said supporting means to permit the lever to be engaged and disengaged with the shifters.

15. In motor vehicle controlling mechanism, the combination of gearing, shifting elements therefor, a first shifting means for moving said elements, a second shifting means including a manually operated shifting lever, means for placing said lever in an active or inactive position, and means for rendering said first shifting means inoperative by placing said lever in an active position.

16. In motor vehicle controlling mechanism, the combination of gearing, shifter rods, a first shifting means, a second shifting means including a manually operated shifting lever, means for placing said lever in an active or inactive position, and means for rendering said first shifting means operative by placing said lever in an inactive position.

17. In motor vehicle controlling mechanism, the combination of gearing comprising shiftable members and shifters therefor, a first shifting means, a second shifting means including lever supporting means and a lever permanently supported by said means in relation to the gearing but movable in said supporting means to permit the lever to be engaged and disengaged with the shifter, the parts being constructed and arranged to permit the lever to be engaged with either shifter in any position in which the shifter may be.

DEMPSTER M. SMITH.

Witnesses:
M. A. WOOD,
A. M. PARKINS.